Sept. 1, 1964 W. K. LANCASTER 3,146,950
SPRAYING APPARATUS
Filed Dec. 22, 1961 4 Sheets-Sheet 1

INVENTOR
William K. Lancaster
BY
Stevens, Davis, Miller & Mosher
ATTORNEYS

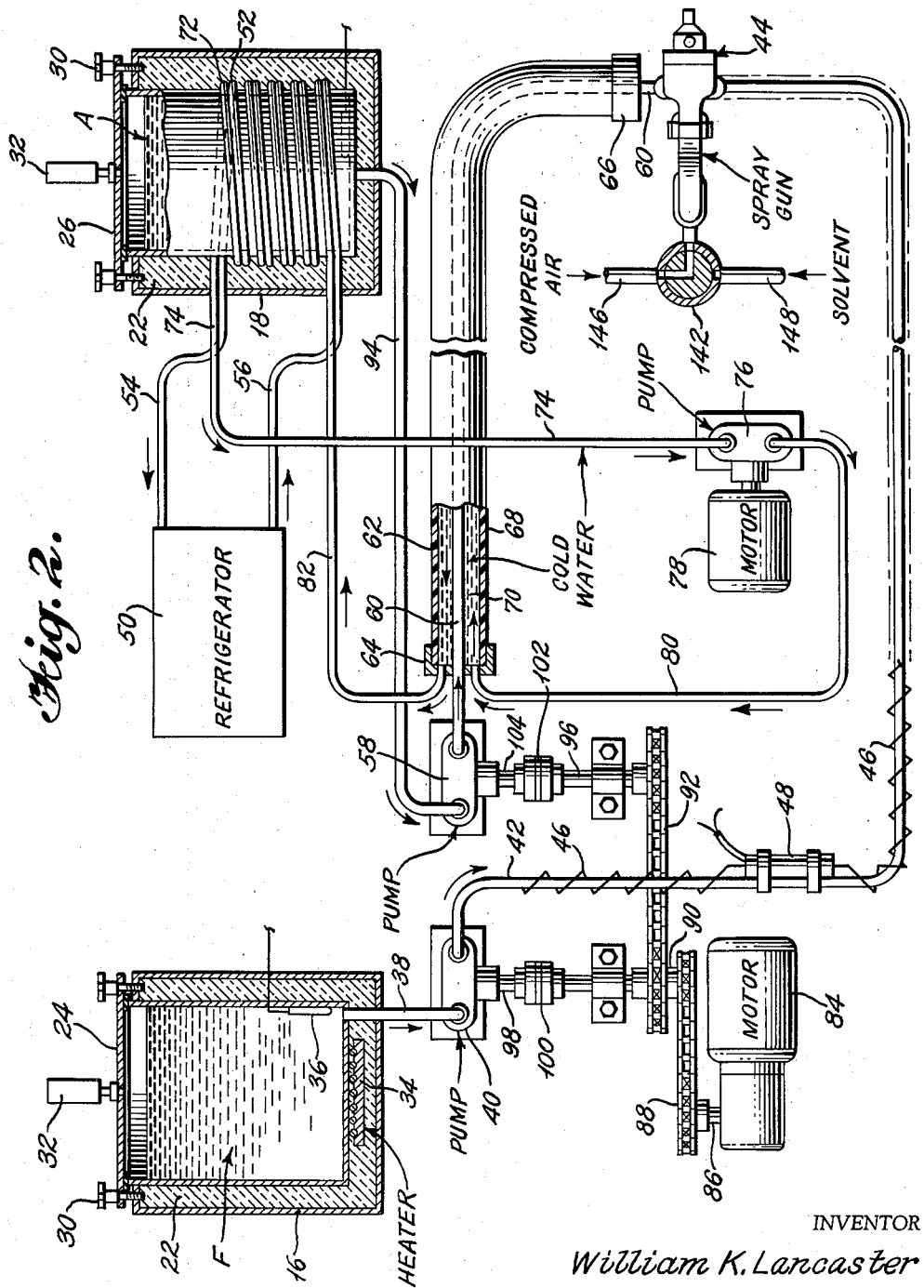

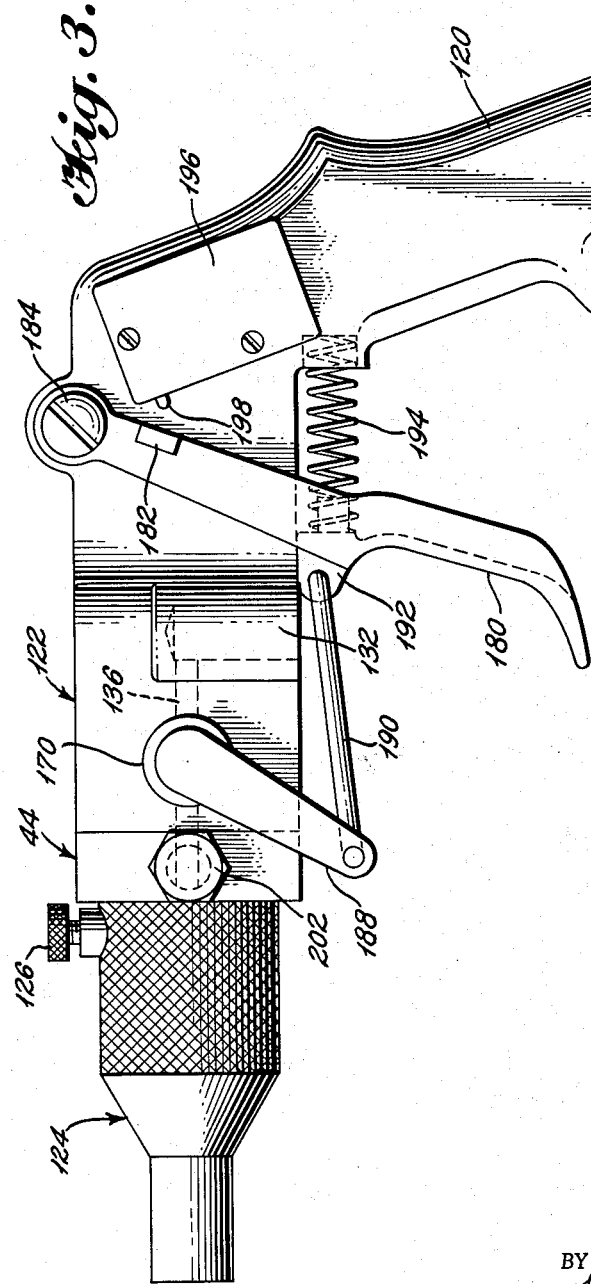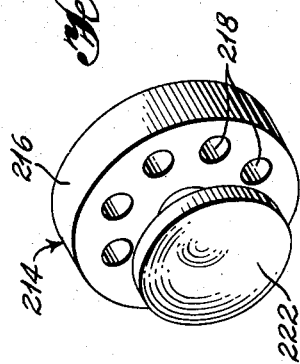

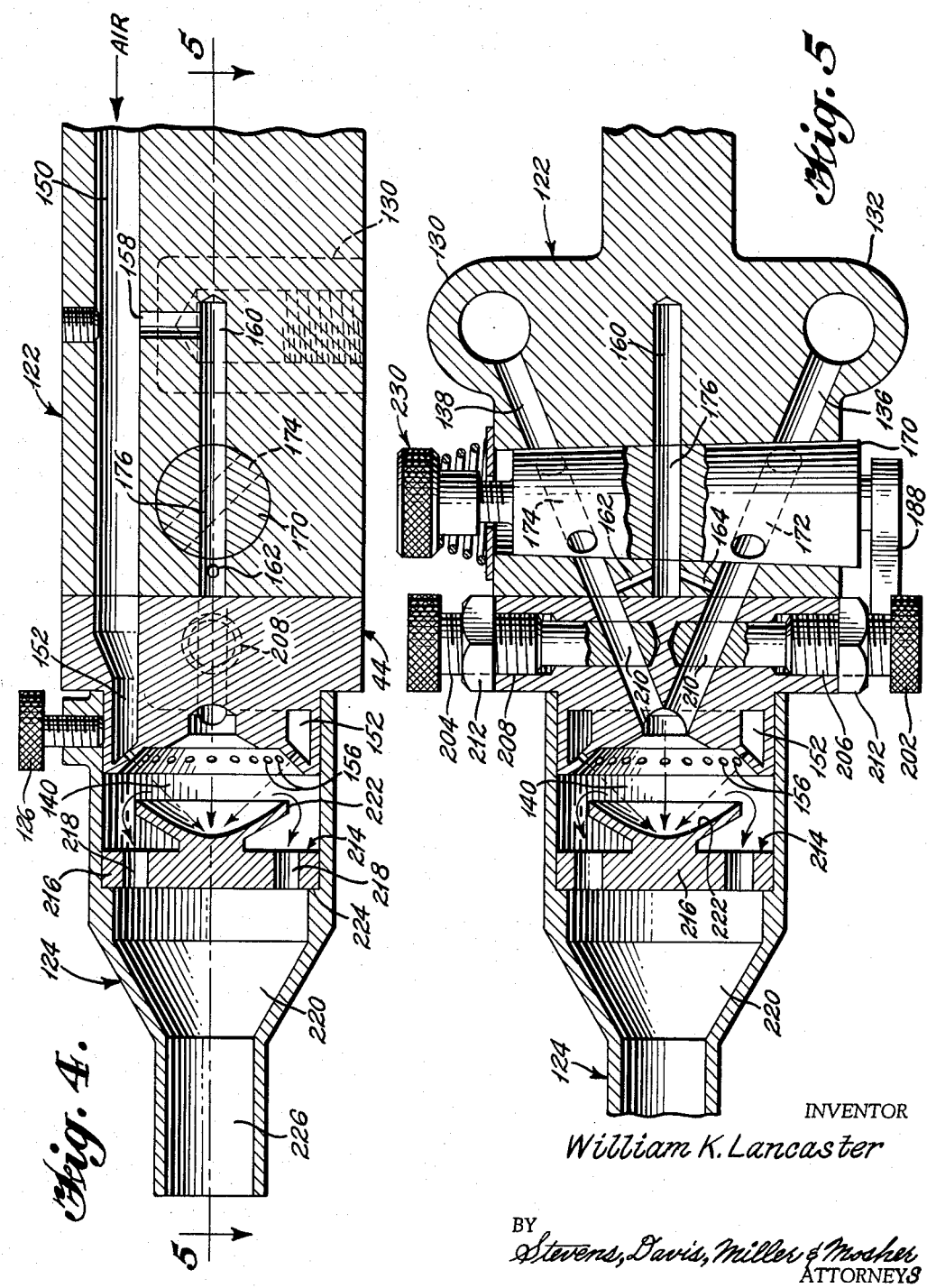

United States Patent Office 3,146,950
Patented Sept. 1, 1964

3,146,950
SPRAYING APPARATUS
William K. Lancaster, 2040 NW. 13th St., Miami, Fla.
Filed Dec. 22, 1961, Ser. No. 161,526
5 Claims. (Cl. 239—128)

The present invention relates to an apparatus for spraying polyurethane foam and more particularly to a component fluid storage and supply cabinet having one heated tank supplying a first fluid to a heated hose and a refrigerated tank supplying a second fluid to a refrigerated hose to maintain the two fluids at uniform temperatures, and a spray gun supplied from the storage tanks having valve means for regulating the proportions of the fluids flowing therethrough, additional valve means to channel compressed air through the gun after use to cleanse the spray gun interior and baffle and atomizing means located within the spray gun mixing chamber to effect an intimate and uniform mixing of the two fluids in the mixing chamber.

The storage, supply and mixing of the components of foaming plastics by the apparatus heretofore employed has been inadequate to maintain the components at the proper temperatures and to accurately mix the components thoroughly and in acurate proportions as is desirable, and as a result thereof the foam produced is not of the uniformity and does not have the superior qualities which are demanded. It should be noted that the maximum tolerance in proportioning is about 3%. Moreover, the prior art devices have been too bulky and cumbersome to enable speedy and facile movement of the apparatus from one work position to another. Additionally, the foam spray guns in use before the instant invention have had inadequate provision for complete and thorough mixing of the foam spray constituents and have had no provision for easy cleaning of the conduits within the gun so as to prevent the obstruction thereof.

It is therefore the general purpose of this invention to provide a unitary, compact, efficient and effective polyurethane foam spraying apparatus having all fluid storage tanks, temperature controls and flow control mechanisms incorporated in a single sturdy, lightweight, easily transported cabinet. The present invention also contemplates the provision of heating means to heat one component fluid from its storage tank through a fluid supply hose until the fluid enters the spray gun, and cooling means to cool a second component fluid from its storage tank through a second fluid supply conduit to the spray gun.

In order to achieve a uniform mixing of the polyurethane foam component fluids, this invention contemplates the provision of a plurality of fine air spray jets in the fluid mixing chamber to atomize the fluid and a baffle located within the spray gun nozzle upon which the mixed fluid impinges in order to achieve a comminution and intimate mixing of the fluid particles. A multiplicity of apertures are provided within a disc, located in the nozzle and contiguous with the rear portion of the baffle, to enable the polyurethane foam to exit the nozzle in a fine spray.

It is also within the purview of this invention to provide a spray gun having a novel valve and conduit configuration such that the air which is used to mix the polyurethane component fluids is automatically caused to pass through the spray gun interior after the flow of such fluids is stopped, to clean out the spray gun and prevent clogging thereof. Moreover, a mechanism is provided to flush a solvent through the component fluid conduits, the mixing chamber and nozzle, when use of the spray gun is completed, to fully remove any harmful material which may remain therein.

In order to provide for accurate control of the proportions of the polyurethane component fluids which are mixed, clutch means are provided in each appropriate fluid supply pump shaft to cut off flow of one fluid so that flow of the other fluid may be measured, the operation then being reversed to measure the quantity of other fluid being supplied. Valve means are provided in each fluid supply duct so that the volumetric flow in each duct may be adjusted.

It is therefore an object of this invention to provide a plastic foam spray apparatus for uniformly and accurately regulating the temperature and relative mixing proportions of polyurethane components.

It is a further object of this invention to provide a plastic foam spray gun wherein simple and efficient means are provided for purging fluid conduits within the gun.

It is a concomitant object of this invention to provide a polyurethane spray gun of such construction that complete and intimate mixing of the fluids into a fine spray is achieved.

It is a still further object of this invention to provide a plastic foam spray apparatus which is lightweight, compact, efficient and easily manipulated.

It is another object to provide a plastic foam spray apparatus having a separate storage tank and supply hose for each polyurethane component fluid and wherein a storage tank and hose are heated to maintain the fluid contained therein at a constant high temperature and a storage tank and hose are refrigerated to maintain the fluid contained therein at a constant low temperature.

It is an additional object of this invention to provide a plastic foam spray apparatus in which the pump for each polyurethane component fluid has separate disconnecting means so that flow of one fluid is prevented in order that flow of the other fluid can be measured, and the procedure reversed so that the proportions of the fluids being mixed may be determined.

It is yet a further object of this invention to provide adjustable valve means in each of the fluid component conduits in a plastic foam spray gun to adjust the proportions of the fluids being mixed.

A further object of this invention is to provide a plastic foam spray gun having valve means responsive to release of the spray gun trigger to provide a flow of compressed air through the interior of the spray gun to cleanse the same.

A still further object of this invention is to provide a spray gun having a mixing chamber wherein atomizing means atomize the fluids being mixed, a baffle has a concave face in the direction of flow of the fluids being mixed to effect an intimate mixing thereof, and a disc having a multiplicity of small holes therein blocks the path of flow of the mixed fluid so that the fluid is dispensed in a fine spray.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein:

FIG. 2 is a schematic view of the fluid supply and control mechanism of the invention;

FIG. 3 is a side elevation of a spray gun which forms a part of the invention;

FIG. 4 is a fragmentary vertical axial sectional view of the apparatus shown in FIG. 3;

FIG. 5 is a section taken on the line 5—5 of FIG. 4; and

FIG. 6, is an isometric view of the nozzle insert device which forms a part of the invention.

Figure 1:
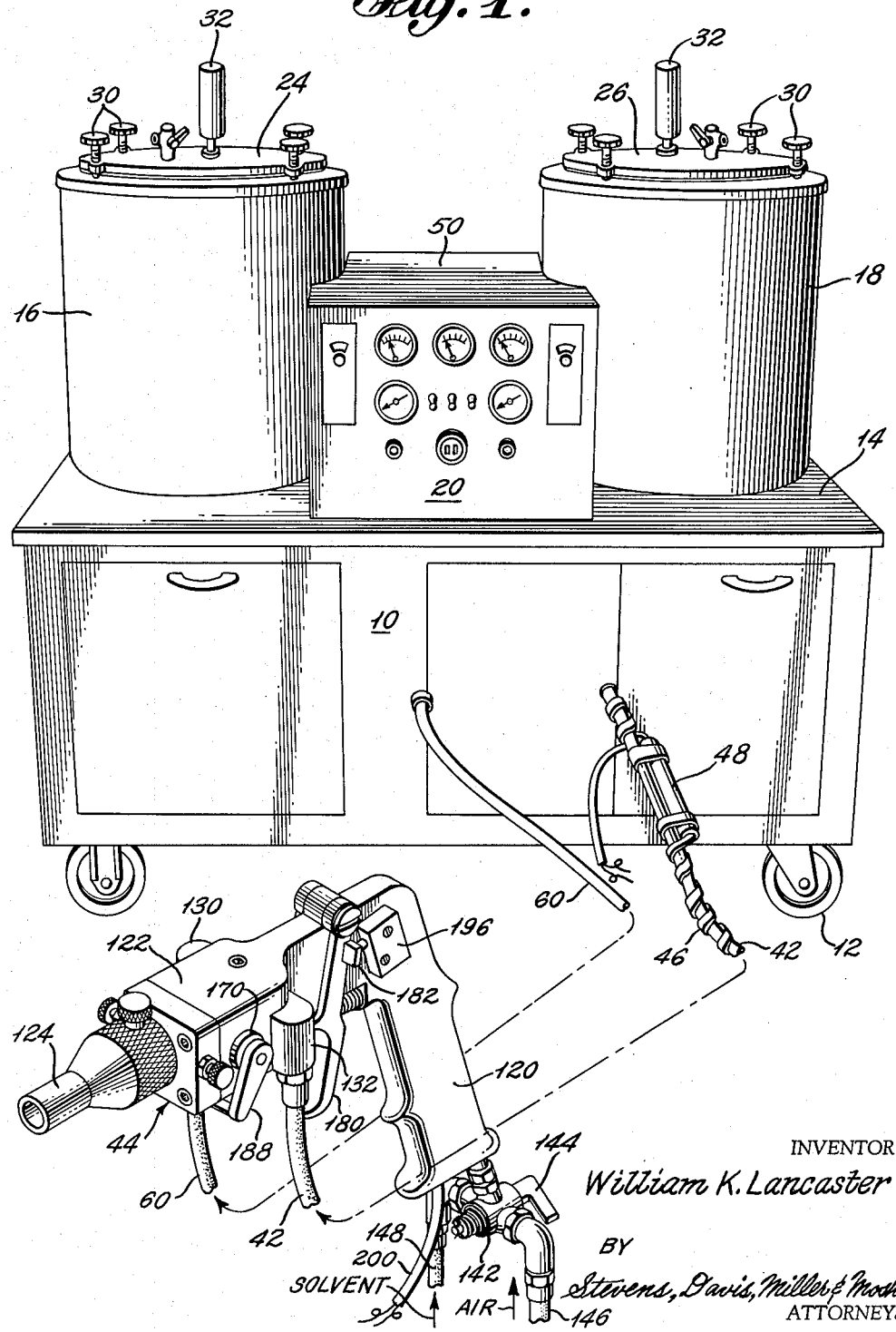
FIG. 1 shows a perspective view of a preferred embodiment of the invention.

Referring now to the drawings, there is shown in FIG. 1 a chassis 10, constructed of welded aluminum plates and movably mounted on casters 12. Mounted on the top 14 of the cabinet are two fluid tanks or pots 16 and 18 which contain the components of the polyurethane foam, and mounted between said tanks is an instrument panel 20 which is provided with appropriate switches and pressure and temperature indicators, in a manner well known in the art, to regulate the mechanism of this invention and indicate the readings of the various pressure and temperature controls. The fluid tanks 16 and 18 are each double-walled and a 2-inch layer 22 of urethane foam insulating material is located between each pair of walls. The tanks are closed by means of lids 24 and 26, respectively, which are secured to the tanks by bolts 30. A dryer 32 containing a desiccant material such as silica gel crystals is mounted on each lid so that any moisture, brought in by the incoming air when the fluid is pumped out, is adsorbed by the crystals. Mounted in the base of tank 16 is a heater 34 which is utilized to heat the fluid in the tank and thereby reduce its viscosity. Thermocouple 36 is mounted on the inner wall of tank 16, adjacent the fluid conduit 38 therein, and is utilized to regulate heater 34 in a manner well known in the art, to maintain the fluid F in the tank at a constant temperature between 120° F. and 150° F. Fluid F is transported through conduit 38 to pump 40 from whence it is pumped through flexible hose 42 to spray gun 44. Hose 42 has electric heating tape 46 wound thereabout along the entire length thereof in order to maintain the fluid in a state of low viscosity and temperature controller 48 is mounted on the hose and regulates electric heating tape 46, in a manner well known in the art, to keep fluid F at a constant temperature.

Tank 18 is filled with a fluid A which contains Freon 11, for use as a blowing agent, and inasmuch as Freon 11 has a boiling point of 75° F., the temperature of this fluid must be kept at 65° F. or lower. Therefore, a refrigerating unit 50 is located on top of chassis 10 behind instrument panel 20. Cooling conduit 52 is formed of copper tubing and is coiled around the inner wall of tank 18 and soldered thereto for the purpose of maintaining fluid A at a low temperature. A liquid refrigerant is circulated to the cooling coils by means of pipe 56 and is returned to the refrigerating unit for recycling by means of pipe 54.

Fluid A is transported from tank 18 through conduit 94 to pump 58 from whence it is pumped through flexible hose 60 to the spray gun. In order to maintain fluid A at a constant low temperature until it reaches spray gun 44, a jacket 62 of circulating cold water is mounted around hose 60 by means of end caps 64 and 66. Jacket 62 is compartmented in a manner well known in the art (not shown) such that cooling water enters into compartment 68 and exits through compartment 70. A water conduit 72 formed of copper tubing is coiled around the inner wall of tank 18 in such a manner that the coils of conduit 72 alternate with the coils of cooling conduit 52. The water in conduit 72 is cooled by heat transfer with the refrigerant in conduit 52. The cold water in conduit 72 exits through hose 74 to pump 76 which is driven by motor 78 and is pumped through hose 80 to the water jacket 62. Hose 82 conveys the water exiting from compartment 70 into conduit 72 for recooling.

The output shaft 86 of motor 84 has mounted thereon a sprocket which drives chain 88 which in turn drives shaft 90 by means of a sprocket mounted thereon. A second sprocket mounted on shaft 90 drives chain 92 which in turn drives shaft 96. Shaft 90 acts through flexible coupling 100 to drive the shaft 98 which is the drive shaft of pump 40. Shaft 96 acts through flexible coupling 102 to drive the shaft 104 which is the drive shaft of pump 58. One of the coupling elements of either coupling may be slid back on its shaft to disconnect its respective pump in order to measure the proportions of fluid being mixed as will be hereinafter described.

The spray gun, as seen in FIG. 3 comprises a pistol-shaped structure including a hand grip 120, a barrel 122 and a nozzle member 124 projecting from the forward end of the barrel, and removably connected thereto by means of bolt 126 which presses the nozzle against the outer portion of mixing nozzle 128 which extends from the front of the barrel. Approximately midway between its ends the barrel has lateral extensions or bosses 130 and 132. Referring to FIG. 1, the boss 132 has attached thereto the flexible hose 42. Similarly, the boss 130 has attached thereto the flexible hose 60.

As shown in FIG. 5 the hoses 42 and 60 communicate respectively with ducts 136 and 138 which converge relative to each other and communicate at their forward ends with a mixing chamber 140, which will be more fully discussed hereinafter. Referring to FIG. 1 the hand grip 120 has attached thereto a three-way valve 142 which is operated by valve handle 144 and to which are connected a flexible tube 146 whereby compressed air is conducted to the device from a suitable source (not shown) and a flexible tube 148 whereby a solvent is conducted to the device from a suitable source (not shown). As best seen in FIG. 2 the valve handle 144 may be set to a first position whereby only compressed air is conducted through the valve, a second position whereby only solvent is conducted through the valve and a third position whereby no flow is permitted through the valve. Fluid conducted through valve 142 passes through a duct in the hand grip (not shown) to a conduit 150 in the barrel, said conduit being of cylindrical shape and disposed in parallel relation to the axis of the barrel. The compressed air in conduit 150 flows into a peripheral circular passage 152 which is located adjacent the outer portion of the mixing nozzle 128 and from which the compressed air exits into mixing chamber 140 through a multiplicity of angularly disposed converging ports 156 located around the periphery of mixing nozzle 128, forward of circular passage 152. At approximately the mid-point of conduit 150 a vertical duct 158 is located, the latter acting to interconnect conduit 150 and a cylindrical conduit 160 which is located below and parallel to conduit 150, extending forwardly of duct 158 and in the same plane as ducts 136 and 138. The length of conduit 160 is approximately two-thirds of the length of conduit 150 from its mid-point to circular passage 152. At the forward end of conduit 160 two diverging ducts 162 and 164, respectively, interconnect conduit 160 with ducts 136 and 138. Extending crosswise of the barrel 122 and slightly behind ducts 162 and 164 there is rotatably positioned a frustro-conical valve stem 170 which intersects conduit 160 and 136 and 138 so as to prevent flow therethrough. Formed in valve stem 170 there are two converging passages 172 and 174, lying in the same plane, and which are respectively of the same cross-sectional area as ducts 136 and 138 and act to permit fluid communication along ducts 136 and 138 when trigger 180 is retracted in a manner which will be more fully discussed hereinafter. Also formed in valve stem 170 through the center thereof is a passage 176 located in a plane making an angle of approximately 30° with the plane of passages 172 and 174 and acting to permit fluid communication along conduit 160 when trigger 180 is in its forward position. Mounted on one end of valve stem 170 is a bolt 230 which cooperates with a tension spring to maintain the valve rotatably in position.

For regulating the position of valve stem 170 and turning on motor 84 which drives pumps 40 and 58 the illustrated device is provided with a trigger 180 for rotating valve stem 170 and closing microswitch 196. The upper portion of trigger 180 is bifurcated to embrace the relatively narrow rear portion of barrel 122. Referring to FIG. 3 the trigger 180 is pivotally mounted on a bolt 184 extending through the barrel and the upper portions of the trigger. A nut (not shown) holds the bolt against endwise movement relative to the barrel 122. A valve arm 188 has one end thereof mounted to the base of frustro-conical valve stem 170 and a link member 190 is pivotally connected at one end to lug 192 on trigger 180 and at its outer end to the second end of valve arm 188. Tension spring 194 is mounted between the rear portion of trigger 180 and the front portion of handle 120 so as to normally urge trigger 180 toward nozzle 124. In this normal position passage 176 is aligned with conduit 160 so as to enable flow of air therethrough in which instance passages 172 and 174 are respectively out of alignment with ducts 136 and 138, as best shown in FIG. 4, so that in this position no fluid may pass through the latter ducts to the mixing nozzle. Microswitch 196 is mounted on the rear portion of the barrel 122 and contact plunger 198 extends forwardly therefrom such that the lug 180a on the side of the trigger contacts the plunger when the trigger is pulled back, thereby closing the microswitch contacts and energizing motor 84 through electric cable 200 in a manner well known in the art. When the trigger is pulled back, valve arm 188 is rotated counterclockwise and passages 172 and 174 in valve stem 170 are respectively aligned with ducts 136 and 138, whereas passage 176 is moved out of alignment with conduit 160 and the body of valve stem 170 blocks conduit 160 such that no air may pass therethrough to ducts 162 and 164.

As best seen in FIG. 5, two thumbscrew valves 202 and 204 are mounted crosswise of the barrel at the forward portion thereof in a pair of diametrically opposed, partially threaded bores 206 and 208, respectively, the forward end of each thumbscrew valve being disposed across the forward portion of one of the ducts 136 and 138 so as to prevent flow therethrough. A circular hole 210 is bored in each thumbscrew valve such that each hole is aligned with its respective duct 136 and 138 when the thumbscrew valve is at its nadir within the barrel. A nut 212 is provided on each thumbscrew to maintain the thumbscrew fixed against rotation regardless of its depth of penetration in the respective bores 206 and 208.

In the mixing chamber there is disposed a nozzle element 214 which contains a disc portion 216 which is freely slidable in the mixing chamber and the diameter of which is slightly less than the mixing chamber diameter. A plurality of circular holes 218 around the periphery of disc element 216 provide communication between mixing chamber 140 and converging nozzle portion 220 of nozzle 124. On the rear face of disc element 216 and integral therewith is a baffle portion 222 which is of circular cross-section and presents a concave face to the fluid flowing into the mixing chamber 140 through barrel 122. Nozzle element 214 is maintained in position against shoulder 224 of the mixing chamber by the force of the fluid impinging upon baffle portion 222. Converging nozzle portion 220 is integral with straight nozzle portion 226 through which fluid is exhausted to the atmosphere.

In the operation of the instant apparatus the heater 34, heating tape 46, refrigerator 50 and motor 78 are turned on by means of appropriate switches on instrument panel 20. The three-way valve 142 is then turned from the "off" position to the position shown in FIG. 2 wherein compressed air is fed to the spray gun 44 and flows through conduit 150 into peripheral circular passage 152 from which it flows into mixing chamber 140 through angularly disposed converging ports 156. When the trigger 180 is in its normal forward position shown in FIG. 6 the frustro-conical valve stem is in the position illustrated in FIGS. 4 and 5 and part of the air in conduit 150 is bled through vertical duct 158 into conduit 160 from whence it passes into diverging ducts 162 and 164, which channel the air into ducts 136 and 138 and into mixing chamber 140 at the point of convergence of ducts 136 and 138, and on through nozzle 124 to the atmosphere.

When trigger 180 is pulled back against the action of spring 194, contact plunger 198 of microswitch 196 is pushed back to close the microswitch and thus supply power to motor 84 which in turn starts up pumps 40 and 58 to commence the flow of fluids F and A through heated hose 42 and cooled hose 60, respectively, to supply fluid F to duct 138 and fluid A to duct 136. When the trigger is in this pulled back position link member 190 is acted upon by the trigger to rotate valve arm 188 and consequently valve stem 170. In this position passages 172 and 174 are aligned with their respective ducts 136 and 138 and fluids A and F flow therethrough into mixing chamber 140, and passage 176 is out of alignment with conduit 160 so that the body of valve stem 170 blocks this conduit to prevent flow of air therethrough into ducts 136 and 138. The ducts 136 and 138 converge in mixing chamber 140 and the fluids A and F begin to mix at this point of convergence. The air flowing through converging ports 156 atomizes the partially mixed fluids A and F and causes them to impinge upon baffle 222 to effect a thorough mixing of fluids A and F. It is in the mixing chamber that fluids A and F interact to form a polyurethane foam, and the back pressure of fluids A and F and the compressed air acts to force the foam around the edges of baffle 222 and into the converging nozzle portion through holes 218 in disc element 216. The foam passes from converging nozzle portion into straight nozzle portion 226 from a fine spray in which form it exits into the atmosphere to be deposited at a suitable place at which the spray gun is directed.

When trigger 180 is released tension spring 194 urges the trigger forward, releasing microswitch plunger 198, thereby shutting off motor 84 and consequently pumps 40 and 58, to prevent further flow of fluids F and A, and rotating valve arm 188 and consequently valve stem 170 clockwise to the position shown in FIGS. 4 and 5 so that the body of the valve stem 170 blocks ducts 136 and 138 and valve stem passage 176 is aligned with conduit 160 to allow flow of compressed air therethrough. The compressed air in conduit 160 flows through ducts 162 and 164 into ducts 136 and 138, respectively, and thence through mixing chamber 140 and out nozzle 124. The compressed air in conduit 150 flowing through circular passage 152 into mixing chamber 140 and exiting through nozzle 124 cooperates with the compressed air from conduit 160 to remove any material remaining in the gun which might serve to obstruct the fluid passages. It is important to note that this purging occurs automatically when trigger 180 is released and continues until three-way valve 142 is in the "off" position.

At such time as a more thorough cleansing of the spray gun passages is desired, such as at the end of a work day, three-way valve 142 is turned to the position wherein a suitable solvent is supplied to conduit 150 from flexible tube 148 and flows through the spray gun passages, along the same path that the compressed air follows, in order to more completely purge the spray gun passages of any residue in order to prevent clogging of the passages.

Proportioning of the fluids A and F is either brought about by regulating pumps 40 and 58 to control the quantity of flow therethrough, or by adjusting the thumbscrew valves 202 and 204. The fluid proportions may be measured by turning on the apparatus for normal use and disconnecting either flexible coupling 100 or 102 to prevent operation of its respective pump and consequently preventing supply of the respective fluid to the spray gun. The fluid which is still being pumped is sprayed through the gun onto a gram scale or the like for a given period of time and weighed. The procedure is then reversed for the other fluid so that it alone may be sprayed for the given period of time and weighed. The relative weights indicate the relative proportions of fluids A and F which are being mixed. To adjust the relative proportion of the fluids A and F which are being mixed, flow of one of the fluids will be decreased by partially unscrewing either thumbscrew valve 202 or 204. This will cause partial misalignment of the fluid carrying duct and its respective circular hole 210 so that the effective cross-sectional area of the duct is decreased thereby resulting in a decreased volumetric flow rate therethrough. Nuts 212 are utilized to maintain their respective thumbscrew valves in proper angular position to obtain the desired fluid flow.

While the invention is herein illustrated and described in its embodiment in a device for intermixing the components of polyurethane foams, it is to be understood that the invention in its application to means for storing, regulating mixing and discharging fluid components is not limited to devices for mixing the components of polyurethane foam compositions but is applicable to devices of this type designed for intermixing other fluid components.

Having thus described my invention, what I claim as new and desire to secure by Letters Patent of the United States is:

1. A spray apparatus comprising a block having an end face, a nozzle having an inner wall and attached to said block at the end face, the inner wall of said nozzle defining a mixing chamber proximate to said end face, said block defining a pair of channels opening into said mixing chamber and a bore extending across at least one of said channels, means to introduce fluid into said channels, said channels being adapted to continuously connect said mixing chamber with said fluid introducing means, said block further defining a third channel bifurcating into said pair of channels and adapted to furnish compressed air to them, a valve element rotatably seated in said bore whereby rotation of said valve element regulates the rate of volumetric flow through said channels extended by said bore to determine the proportion of fluids from said channels being dispensed into said mixing chamber.

2. A spray gun comprising a block having an end face, a nozzle having an inner wall of said nozzle defining a mixing chamber proximate to said end face, said block defining a pair of converging channels communicating with said mixing chamber and a third channel bifurcating into said pair of channels and adapted to furnish compressed air to them, and at least one bore intersecting one of said pair of channels, means to introduce fluid into said channels, said channels being adapted to continuously connect said mixing chamber with said fluid introducing means, a valve element rotatably mounted in said bore, said valve element defining a passage intercommunicating the intersected portions of said one channel whereby the degree of rotation of said valve element determines the portion of said passage in direct communication with the intersected portion of said channel thereby regulating the volumetric flow through said channel and consequently the proportion of fluid from said channel dispensed into said mixing chamber.

3. A plastic foam spray gun comprising a block having a first end face and a second end face, an annular nozzle having an inner wall and attached to said block at the first end face, said first end face defining a recess within the confines of the nozzle, the portion of the block adjacent the first end face defining an annular passage, the end face defining a series of convergent ports communicating with said annular passage and spaced about said recess, said block defining a pair of fluid channels opening into said recess and a first gas channel, a three-way valve mounted on said second end face, said block defining a second gas channel interconnecting said valve and said annular passage, said block defining a pair of passages interconnecting said first gas channel and said fluid channels, said block further defining a third passage intercommunicating said first gas passage and said second gas passage, proportioning means between said three way valve and said annular passage so that the proportions of fluids directed to the annular passage from said valve may be regulated to regulate the rate of set up of the plastic.

4. A plastic foam spray apparatus comprising a first storage tank for containing a first fluid, a second storage tank for containing a second fluid, a spray gun having a block portion, said block portion defining a pair of fluid channels, a first conduit intercommunicating one of said fluid channels and said first tank, a second conduit interconnecting the other of said fluid channels and said second tank, heating means mounted in said first tank and said first conduit for maintaining fluid therein at a constant high temperature, refrigerating means mounted on said second tank and said second conduit for maintaining fluid therein at a constant low temperature, an on-off valve in said block regulating volumetric flow of said first and second fluids, and proportioning valve means downstream of said on-off valve to proportionately regulate the relative flow of fluid between said first and second fluid so that the set up rate and texture of the plastic foam issuing from the apparatus may be regulated.

5. A spray apparatus comprising a first storage tank for containing a first fluid, a second storage tank for containing a second fluid, a spray gun having a block portion, said block portion defining a pair of fluid channels, a first conduit communicating with one of said channels for delivery of fluid thereto, a second conduit communicating with the other of said channels for delivery of fluid thereto, a first pump means connected to said first storage tank and said first conduit for delivery of fluid from said first storage tank to said first conduit, a second pump means connected to said second storage tank and said second conduit for delivery of fluid from said second storage tank to said second conduit, heating means mounted in said first storage tank and said first conduit for maintaining fluid therein at a constant high temperature, a refrigerating unit mounted proximate said second tank, a first cooling conduit having spaced coils entwined about said second storage tank, said cooling conduit being interconnected with said refrigerating unit for maintaning fluid in the second storage tank at a constant low temperature, a jacket encompassing said second conduit substantially along its length for maintaining fluid in said second conduit at a constant low temperature and a second cooling conduit having spaced coils entwining said second storage tank in alternating heat transfer relationship with the coils of said first cooling conduit, said second cooling conduit communicating with said jacket.

References Cited in the file of this patent

UNITED STATES PATENTS

| 1,602,722 | Sturdivant | Oct. 12, 1926 |
| 2,564,392 | Burrucker | Aug. 14, 1951 |
| 2,599,680 | Weeks | June 10, 1952 |
| 2,878,063 | Kish et al. | Mar. 17, 1959 |
| 2,991,015 | Standlick | July 4, 1961 |
| 2,992,194 | Paulsen | July 11, 1961 |
| 3,010,658 | Rutter | Nov. 28, 1961 |
| 3,030,892 | Navara | Apr. 24, 1962 |
| 3,040,992 | Wiegand | June 26, 1962 |
| 3,042,311 | Edwards et al. | July 3, 1962 |
| 3,049,439 | Coffman | Aug. 14, 1962 |
| 3,057,273 | Wilson | Oct. 9, 1962 |

FOREIGN PATENTS

| 624,066 | Great Britain | May 26, 1949 |